United States Patent
Ookawa

(10) Patent No.: US 9,785,389 B2
(45) Date of Patent: Oct. 10, 2017

(54) IMAGE FORMING SYSTEM, CONTROL METHOD FOR THE SAME AND RECORDING MEDIUM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Takuya Ookawa, Izunokuni Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 24 days.

(21) Appl. No.: 14/955,206

(22) Filed: Dec. 1, 2015

(65) Prior Publication Data

US 2017/0153857 A1    Jun. 1, 2017

(51) Int. Cl.
*G06F 3/12*    (2006.01)

(52) U.S. Cl.
CPC .......... *G06F 3/1253* (2013.01); *G06F 3/1208* (2013.01); *G06F 3/1211* (2013.01)

(58) Field of Classification Search
USPC ........................................................ 358/1.13
See application file for complete search history.

(56) References Cited

U.S. PATENT DOCUMENTS

| | | | |
|---|---|---|---|
| 9,471,261 B2* | 10/2016 | Kittaka | G06F 3/04817 |
| 2010/0205566 A1* | 8/2010 | Matoba | G06F 3/0488 |
| | | | 715/838 |
| 2011/0075199 A1* | 3/2011 | Jung | H04N 1/00474 |
| | | | 358/1.15 |
| 2014/0237428 A1* | 8/2014 | Miyazaki | G06F 3/0488 |
| | | | 715/833 |

* cited by examiner

*Primary Examiner* — Ngon Nguyen
(74) *Attorney, Agent, or Firm* — Amin, Turocy & Watson LLP

(57) ABSTRACT

An image forming system comprises a display section, an input section, a setting section and an image forming section. The display section displays various reception images corresponding to various image formation settings on functions for image formation. The input section receives an input operation carried out by the user on a reception image. The setting section carries out an image formation setting corresponding to the reception image subjected to the input operation after the input section receives the input operation carried out by the user on the reception image displayed on the display section. The image forming section forms an image based on the image formation setting set by the setting section. The input section receives a single input operation as an input operation for the various image formation settings.

10 Claims, 11 Drawing Sheets

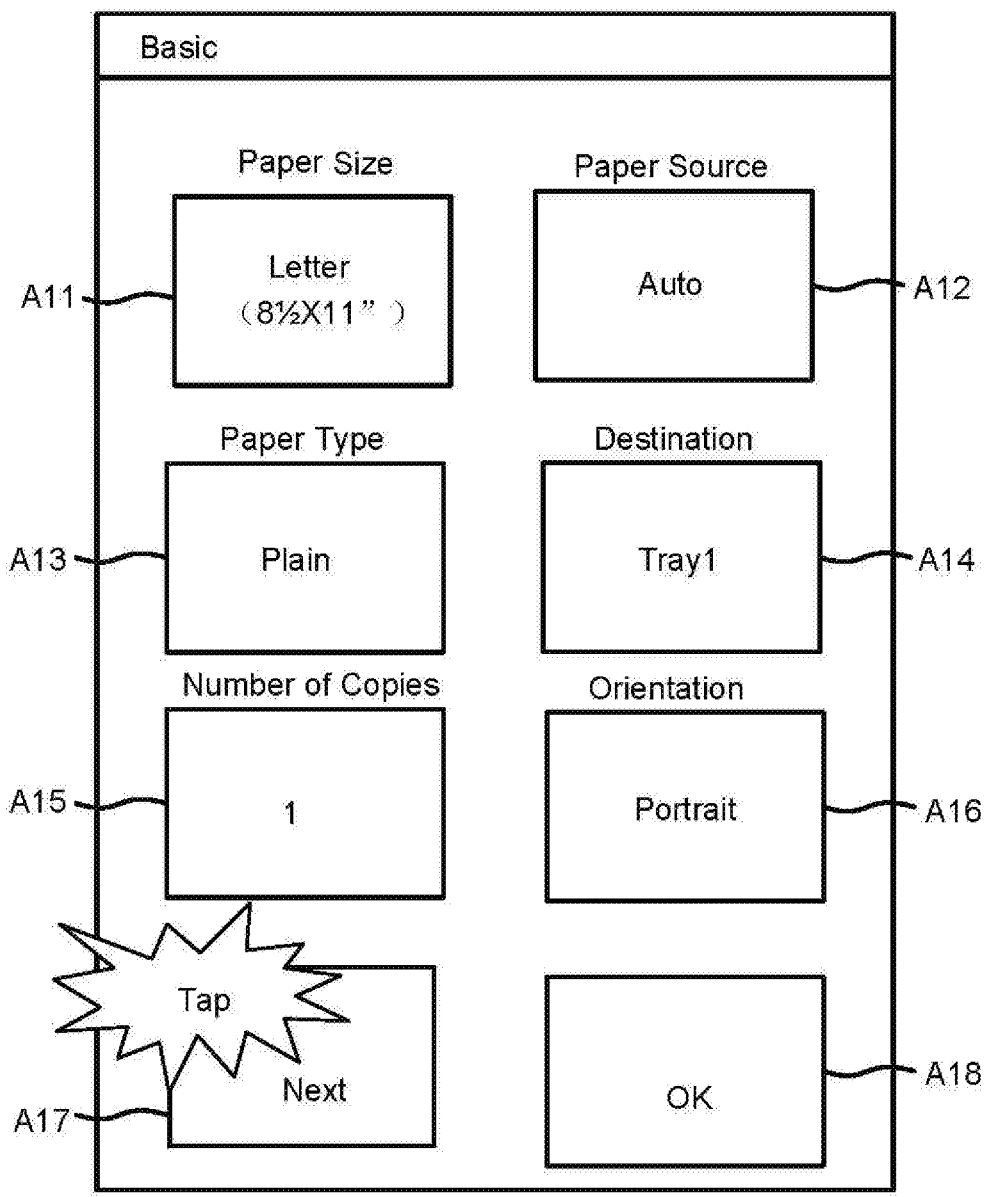

IMAGE FORMING SYSTEM, CONTROL METHOD FOR THE SAME AND RECORDING MEDIUM

FIELD

Embodiments described herein relate generally to an image forming system, a control method for the same and a recording medium.

BACKGROUND

Various settings concerning the formation of an image can be set in an image forming apparatus such as an MFP (Multifunction Peripheral). The settings concerning the formation of an image are set by operating the icons displayed on a setting screen. There are many varieties of settings concerning the formation of an image. The operations corresponding to the variety of settings are determined in the setting process for the image formation. In some cases, the user needs to carry out different operations corresponding to different types of image formation, thus, it is difficult for the user to comprehend the operations.

BRIEF DESCRIPTION OF THE DRAWINGS

FIG. 8A is a schematic diagram exemplifying a change from a print setting screen to an input operation registration screen according to the embodiment.

DETAILED DESCRIPTION

An image forming system comprises a display section, an input section, a setting section and an image forming section. The display section displays various reception images corresponding to various types of image formation settings relating to functions of image formation. The input section receives an input operation carried out by the user on an reception image. The setting section executes an image formation setting corresponding to the reception image subjected to the input operation in such a way that the input section receives the input operation carried out by the user on the reception image displayed on the display section. The image forming section forms an image based on the image formation setting set by the setting section. The input section receives a single input operation as an input operation by the user for the various types of image formation settings.

Embodiments of an image forming apparatus are described below with reference to accompanying drawings in which the same parts are denoted by the same reference signs.

Figure 1:
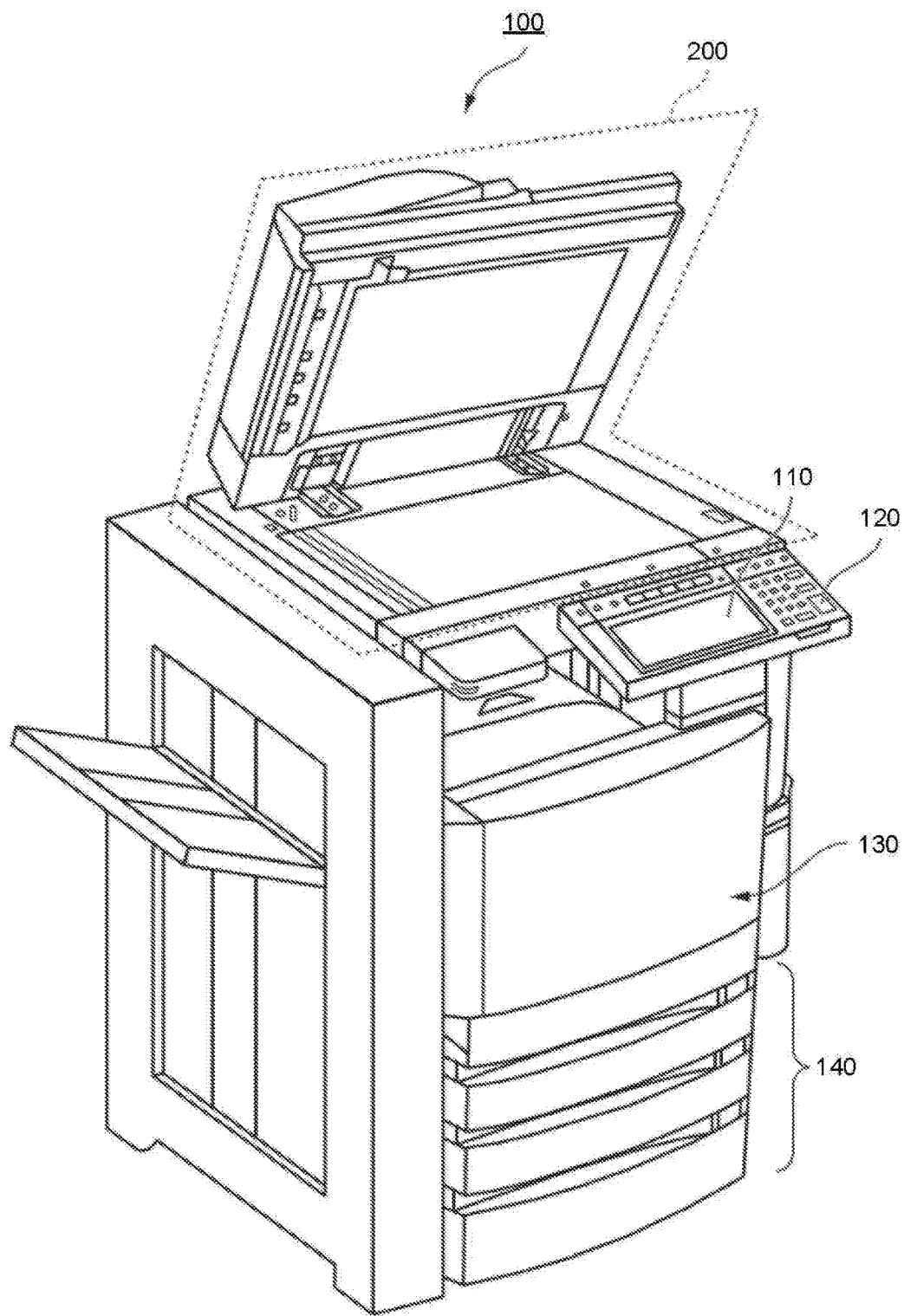
FIG. 1 is an external view exemplifying an image forming apparatus according to an embodiment.

FIG. 1 is an external view exemplifying the whole structure of an image forming apparatus 100 according to the embodiment. The image forming apparatus 100, which is, for example, an MFP, comprises a touch panel 110, a control panel 120, a printer section 130, a sheet accommodation section 140 and an image reading apparatus 200. Moreover, the printer section 130 of the image forming apparatus 100 may be a device for fixing a toner image or an inkjet system device.

The image forming apparatus 100 forms an image on a sheet using a developing agent such as a toner. The sheet is, for example, a paper or label paper. The sheet can be any object as long as the image forming apparatus 100 can form an image on the surface of the object.

The touch panel 110 displays various kinds of information relating to the image forming apparatus 100. The touch panel 110 receives an input operation carried out by the user relating to a function or setting of the image forming apparatus 100. For example, the touch panel 110 receives an input operation of selecting a required function such as a copy function from a plurality of functions.

The control panel 120 comprises a plurality of buttons. The control panel 120 receives an operation of the user. For example, the control panel 120 comprises a power button for turning on or off the power source of the image forming apparatus 100. The control panel 120 receives an input operation on the power button. The control panel 120 outputs information corresponding to the operation of the user to a control section 50.

The printer section 130 forms an image on a sheet according to the image information generated by the image reading apparatus 200 or the image information received through a communication line. The printer section 130 forms an image by, for example, carrying out the following processing: the image forming section of the printer section 130 forms an electrostatic latent image on a photoconductive drum according to the image information; the image forming section of the printer section 130 forms a visible image by making a developing agent attached on the electrostatic latent image, wherein the developing agent is, for example, a toner; the transfer section of the printer section 130 transfers the visible image onto a sheet; and the fixing section of the printer section 130 heats or pressurizes the sheet to fix the visible sheet on the sheet. Further, the sheet on which the image is formed is a sheet housed in the sheet accommodation section 140 or a manually fed sheet.

The sheet accommodation section 140 accommodates a sheet which is used in the printer section 130 for the formation of an image.

The image reading apparatus 200 reads the image information of a reading object as light intensity. The image reading apparatus 200 records the read image information. The recorded image information may also be sent to another information processing apparatus via a network. The recorded image information may be used for the formation of an image on a sheet by the printer section 130.

Figure 2:
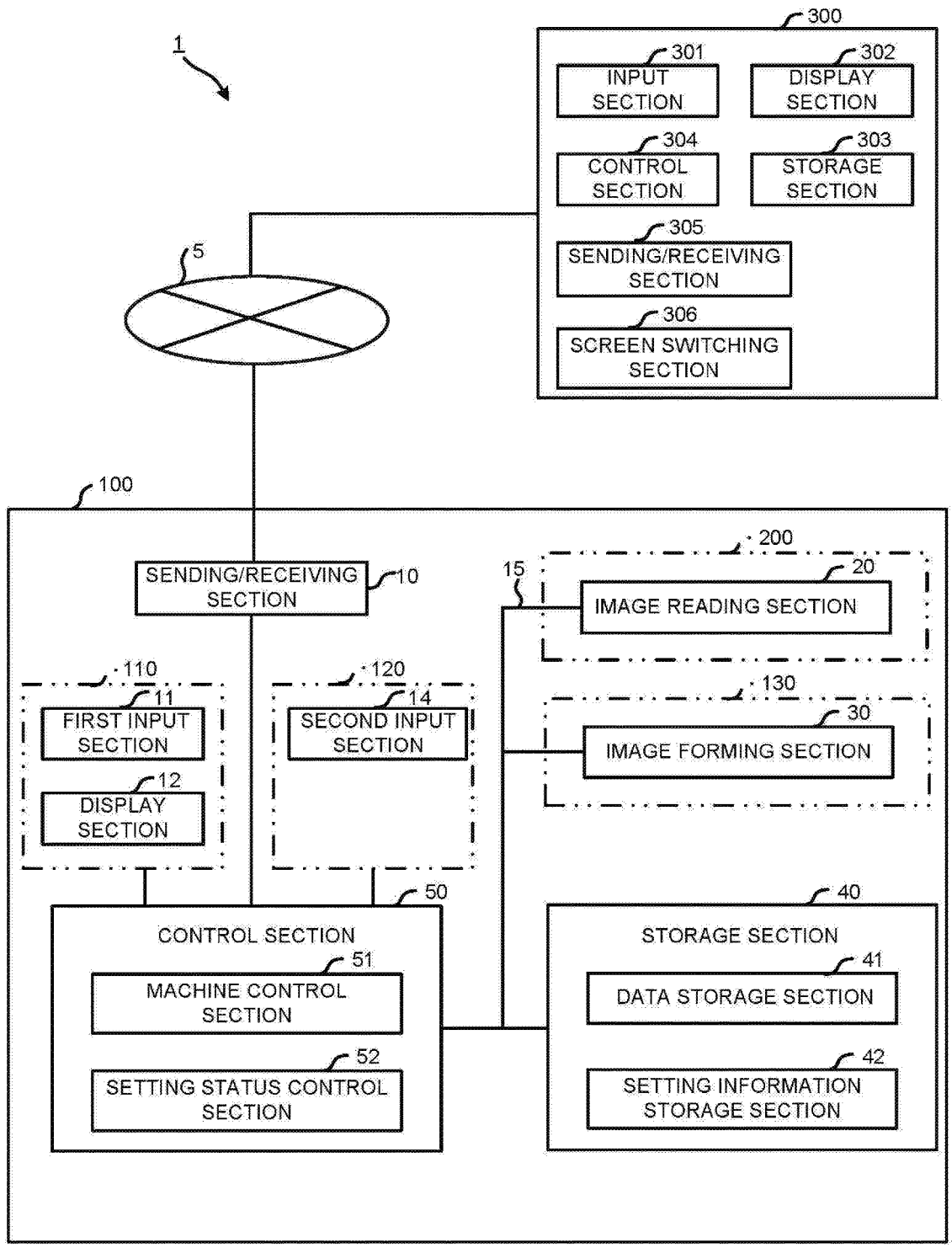
FIG. 2 is a block diagram exemplifying the structure of an image forming system according to the embodiment.

FIG. 2 is a block diagram exemplifying the structure of an image forming system 1 according to the embodiment. The image forming system 1 comprises an image forming apparatus 100 and an input terminal 300. The input terminal 300 is connected through a network 5 with the image forming apparatus 100 in a communicable manner. The network 5 is an information communication network such as an Internet or LAN (Local Area Network).

The image forming apparatus 100 comprises a sending/receiving section 10, a first input section 11, a display section 12, a second input section 14, an image reading section 20, an image forming section 30, a storage section 40 and the control section 50. The whole sections of the image forming apparatus 100 are connected through an internal bus line 15 and exchange data with each other by the internal bus line 15.

The sending/receiving section 10 sends various kinds of information supplied from the control section 50 to the input terminal 300. The sending/receiving section 10 sends various kinds of information supplied from the input terminal 300 to each section of the control section 50. For example, the sending/receiving section 10 supplies the print start information sent from the input terminal 300 to a machine control section 51.

The first input section 11 and the display section 12 are integrated into the touch panel 110 which receives an input operation carried out by the user on a displayed icon. The first input section 11 is an input device which receives an input operation of the user by detecting a touch on the screen of the display section 12. If the input operation of the user is received, the first input section 11 supplies input operation information corresponding to the received input operation to the control section 50.

The display section 12 comprises a liquid crystal display or an organic EL display for displaying an image, characters and the like. The display section 12 displays an image corresponding to the display image information supplied from the control section 50. The screens displayed on the display section 12 include a standby screen. The standby screen is a screen displayed on the display section 12 when the image forming apparatus 100 is in a standby state before each function of the image forming apparatus 100 is executed. Icons corresponding to a copy function, a print function, a scan function and a faxing function are displayed on the standby screen. By carrying out an input operation on the icon, the image forming apparatus 100 executes a function corresponding to the icon subjected to the input operation.

The second input section 14 is an input device for receiving an input operation on the control panel 120. For example, the second input section 14 receives a setting on a function of the image forming apparatus 100 through an input operation carried out by the user on the control panel 120. If the input operation carried out by the user is received, the second input section 14 sends input operation information corresponding to the received input operation to the control section 50.

The image reading section 20 comprises a sensor such as a CIS (Contact Image Sensor) or a CCD (Charge Coupled Device). For example, the image reading section 20 uses the sensor to read a sheet on which an original document, characters or an image is or are recorded to generate digital data. Further, the image reading section 20 is contained in the image reading apparatus 200 shown in FIG. 1.

The image forming section 30 prints an image or characters corresponding to the digital data on a sheet such as a printing paper. Not limited to print system of fixing a toner image, the image forming section 30 may also print in an inkjet system or using another image formation system. Further, the image forming section 30 is contained in the printing section 130 shown in FIG. 1.

The storage section 40 consists of a recording medium such as a flash ROM or a HDD (Hard Disk Drive) or a combination of these recording mediums. For example, the storage section stores programs, data and various information for controlling each section of the image forming apparatus 100. For example, the storage section 40 comprises a data storage section 41 and a setting information storage section 42.

The data storage section 41 stores the various kinds of information and data required by the execution of a function such as a copy function, a print function, a scan function and a faxing function. For example, the data storage section 41 stores information representing the function, the type or size of printing paper or the number of copies selected in the image forming apparatus 100 through an operation of the user. The data storage section 41 stores the digital data generated in the reading of a sheet by the image reading section 20. The data storage section 41 stores the digital data received by means of a faxing function when the image forming apparatus 100 executes a faxing function. For example, the image forming section 30 prints an image or characters corresponding to the digital data stored in the data storage section 41 on a sheet.

The data storage section 41 stores initial status information. The initial status information represents the initial status of the image forming apparatus 100. The initial status is set in advance. For example, the setting status of the image forming apparatus 100 when the image forming apparatus 100 is initially launched after being delivered from the factory is set to be the initial status.

The setting information storage section 42 stores setting status information. The setting status information represents a setting status of the image forming apparatus 100. The setting status of the image forming apparatus 100 is, for example, a setting status representing which one of a copy function, a print function, a scan function and a faxing function is selected.

The control section 50 comprises a CPU (Central Processing section) or a dedicated processor functioning as the control center of the image forming apparatus 100. The control section 50 controls each section of the image forming apparatus 100. For example, the control section 50 comprises a machine control section 51 and a setting status control section 52.

The machine control section 51 executes various functions by controlling the operations of each section of the image forming apparatus 100. The various functions include a copy function, a print function, a scan function and a faxing function. For example, the machine control section 51 controls the operations of each section of the image forming apparatus 100 according to a function selected through an input operation of the user received by the first input section 11 or the second input section. Specifically, the machine control section 51 controls the reading operation of the image reading section 20 according to the input operation of the user. The machine control section 51 controls the storage of the digital data generated by the image reading section 20 in the data storage section 41. Further, the machine control section 51 controls the reading of digital data from the data storage section 41 or the printing of the read digital data by the image forming section 30.

The machine control section 51 executes an image control to control the display of an image on the display section 12 of the touch panel 110. For example, the machine control section 51 displays a standby screen on the display section 12 when none of the functions such as a copy function is executed. Icons corresponding to the copy function, the print function, the scan function and the faxing function are displayed on the standby screen. A function is executed after the user selects a corresponding icon and executes an input operation. The machine control section 51 starts a print job using a print function when print start information is sent from the sending/receiving section 10.

The setting status control section 52 controls the setting status of the image forming apparatus 100. The setting status control section 52 refers to the setting status information stored in the setting information storage section 42. By referring to the setting status information, the setting status control section 52 changes the setting status of the image forming apparatus 100 into the setting status stored in the setting information storage section 42.

The input terminal 300 comprises an input section 301, a display section 302, a storage section 303, a control section 304, a sending/receiving section 305 and a screen switching section 306. The input section 301 and the display section 302 are integrated into a touch panel which receives an input operation carried out by the user on a displayed icon. The input section 301 is an input device which receives an input operation of the user by detecting a touch on the screen of the display section 302. The input section 301 receives an input operation of the user relating to a print setting. The input section 301 supplies input operation information corresponding to the received input operation to the control section 304.

The display section 302 comprises a liquid crystal display or an organic EL display for displaying an image, characters and the like. The display section 302 displays an image corresponding to the display image information supplied from the control section 304. The display image information includes information of an image for a print setting.

Figure 3:
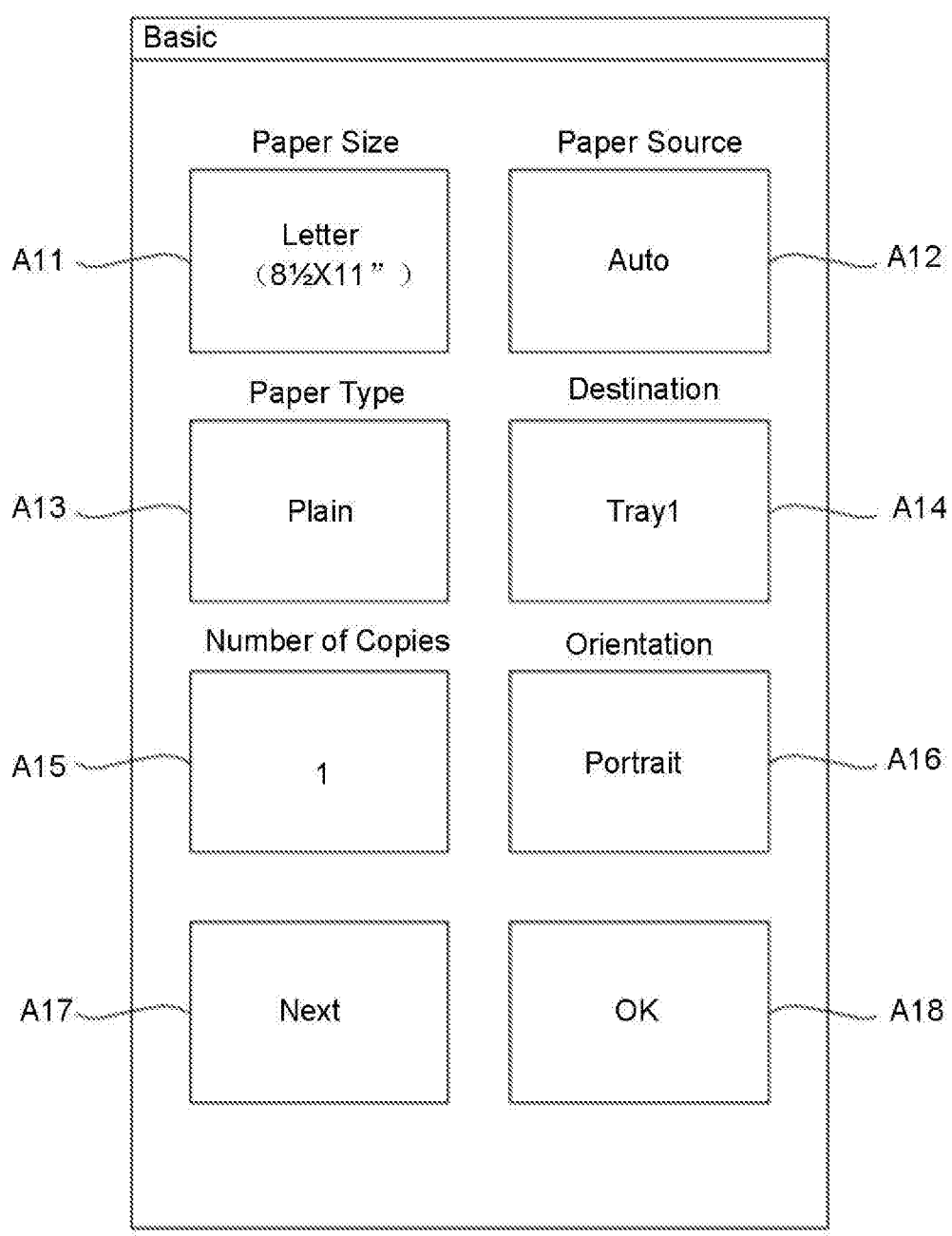
FIG. 3 is a schematic diagram exemplifying a displayed print setting screen according to the embodiment.

The print setting refers to a setting on the type and the size of a sheet used for the print using a copy or print function. FIG. 3 is a schematic diagram exemplifying a print setting screen displayed on the display section 302. The example shown in FIG. 3 is a print setting screen on which icons A11-A18 are displayed. The icons A11-A18 are displayed on the same screen. Print setting items include items such as 'Paper Size', 'Paper Source', 'Paper Type', 'Destination', 'Number of Copies' and 'Orientation'. Item icons A11-A16 are set for the six print settings. Specifically, an icon 'Paper Size' A11 is set for the item 'Paper Size'. An icon 'Paper Source' A12 is set for the item 'Paper Source'. An icon 'Paper Type' A13 is set for the item 'Paper Type'. An icon 'Destination' A14 is set for the item 'Destination'. An icon 'Number of Copies' A15 is set for the item 'Number of Copies'. An icon 'Orientation' A16 is set for the item 'Orientation'.

The item 'Paper Size' is an item for setting the size of the paper to be used. For example, the options provided in the item 'Paper Size' include 'Letter (8½×11")' and 'Legal (8½×14")'. The item 'Paper Source' is an item for setting a paper feed method. For example, the options provided in the item 'Paper Source' include 'Auto' and 'Manual'. The item 'Paper Type' is an item for setting the type of the paper to be used. For example, the options provided in the item 'Paper Type' include 'Normal' and 'printing paper'.

The item 'Destination' is an item for setting a paper discharging method. For example, the options provided in the item 'Destination' include 'Tray 1' and 'Tray 2'. The item 'Number of Copies' is an item for setting the number of the copies. A numeral such as '1', '2' or '3' is set in the item 'Number of Copies'. The item 'Orientation' is an item for setting a print orientation. For example, the options provided in the item 'Orientation' include 'Portrait' and 'Landscape'.

The icon 'Next' A17 is an icon for the transfer to the next page of the print setting screen. The second page of the print setting screen is displayed after an input operation is executed on the icon 'Next' A17. The icon 'OK' A18 is an icon for confirming a print setting. A print setting is confirmed if an input operation is executed on the icon 'OK' A18. After a print setting is confirmed, an icon 'start printing' is displayed on the display section 302. The input section 301 supplies print start information to the control section 304 after the icon 'start printing' is operated. The print start information includes information for starting a print job and print setting information.

Figure 4:
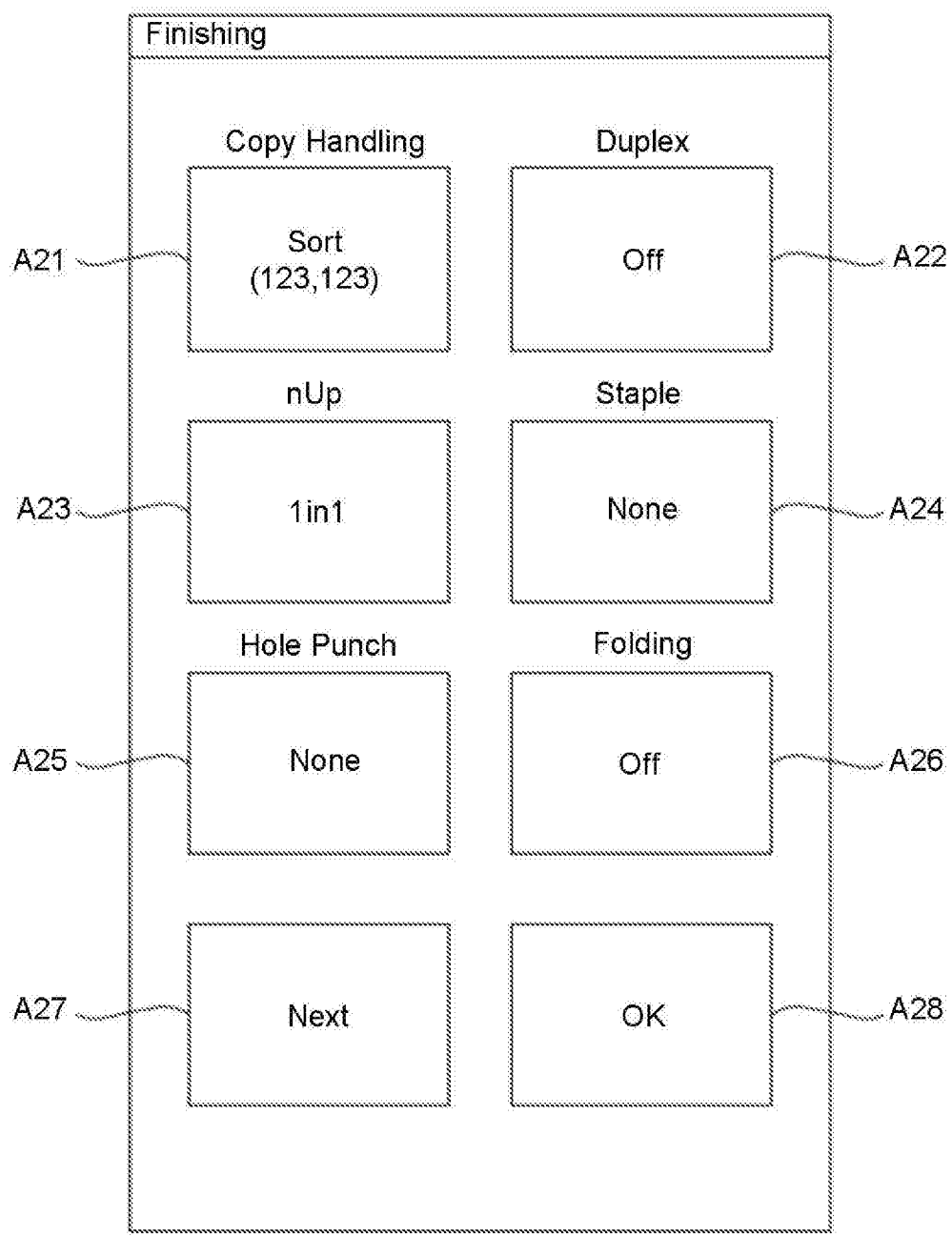
FIG. 4 is a schematic diagram exemplifying the next page of the print setting screen according to the embodiment.

FIG. 4 is a schematic diagram exemplifying a next page of a print setting screen. The example shown in FIG. 4 is a print setting screen on which icons A21-A28 are displayed. The icons A21-A28 are displayed on the same screen.

Print setting items include items such as 'Copy Handling', 'Duplex', 'nUp', 'Staple', 'Hole Punch' and 'Folding'. Item icons A21-A26 are set for the six print settings. An icon 'Copy Handling' A21 is set for the item 'Copy Handling'. An icon 'Duplex' A22 is set for the item 'Duplex'. An icon 'nUp' A23 is set for the item 'nUp'. An icon 'Staple' A24 is set for the item 'Staple'. An icon 'Hole Punch' A25 is set for the item 'Hole Punch'. An icon 'Folding' A26 is set for the item 'Folding'.

The icon 'Next' A27 is an icon for the transfer to the next page of the print setting screen. The print setting screen is transferred to the next page after an input operation is executed on the icon 'Next' A27. The icon 'OK' A28 is an icon for confirming a print setting. A print setting is confirmed after an input operation is executed on the icon 'OK' A28.

The storage section 303 stores print setting information relating to the print setting items. Specifically, the storage section 303 stores print setting information of the items 'Paper Size', 'Paper Source', 'Paper Type', 'Destination', 'Number of Copies', 'Orientation', Copy Handling', 'Duplex', 'nUp', 'Staple', 'Hole Punch' and 'Folding'. For example, the storage section 303 stores print setting information such as 'Letter (8½×11")' or 'Legal (8½×14")' which relates to the item 'Paper Size' as the 'Paper Size'.

Various input operations are available for inputting the icons A11-A18 displayed on the display section 302. The user can input the item setting icons A11-A16 displayed on the same screen of the display section 302 by optionally carrying out a single one of the input operations.

For example, the input operations for the item setting icons A11-A16 are 'tap', 'flick', 'long press', 'pinch', 'stretch' and 'swipe'. Further, 'flick', 'swipe', 'pinch' and 'stretch' are input operations for determining the movement track of an input operation. The movement track includes the movement track of a straight line extending in one direction of a forward, a backward, a left, a right and an inclined direction. The movement track includes a movement track formed by a combination of the foregoing movement tracks and having a reflecting point. In addition to linear movement tracks, there are also curved movement tracks. The storage section 303 stores the width or track of an input operation as a movement track. The icons A11-A18 and the icons A21-A28 can be input by an organic entity such as a finger. The input operation can also be executed using an inorganic entity such as a pen.

Figure 5:
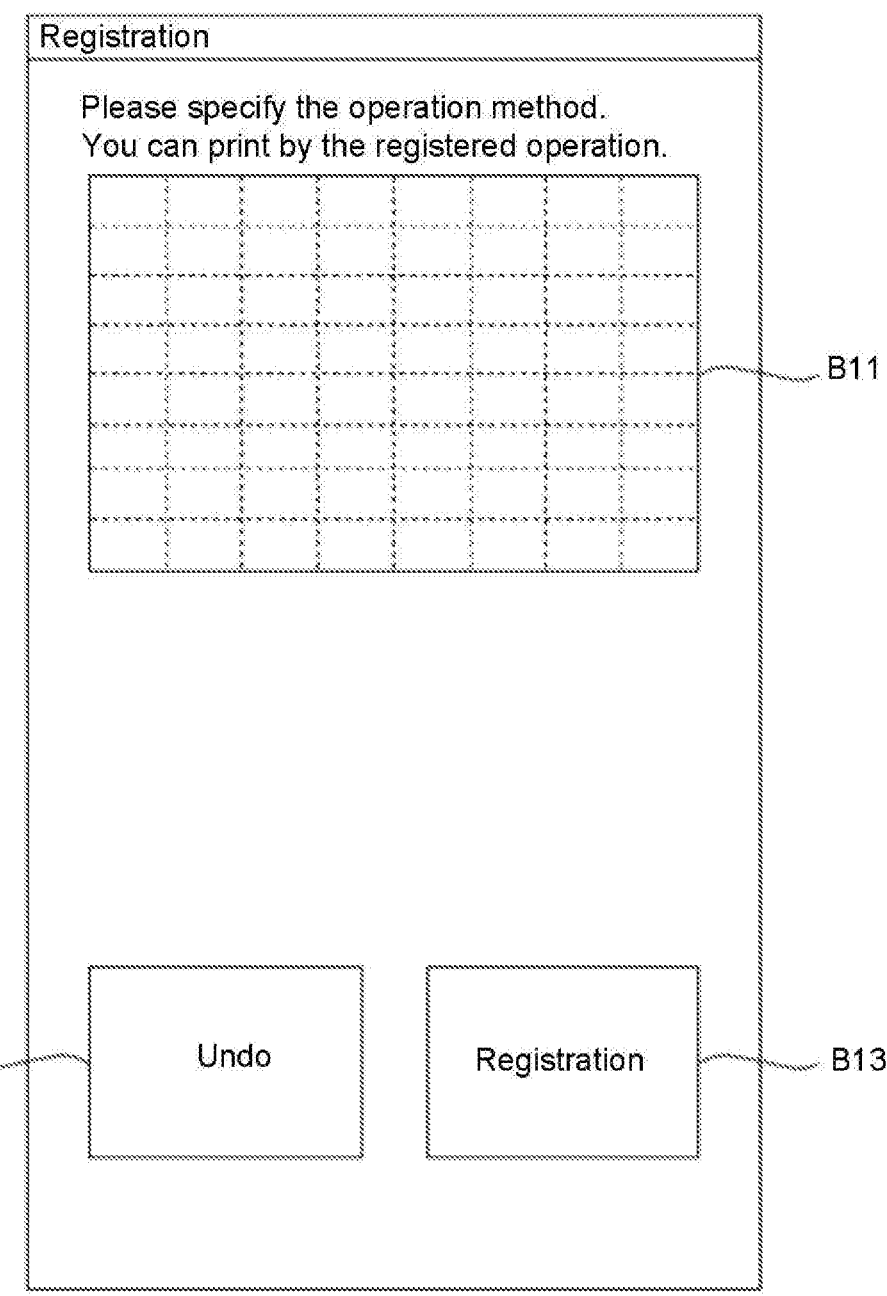
FIG. 5 is a schematic diagram exemplifying a displayed input operation registration screen according to the embodiment.

The user can register input operations for the icons A11-A18 and A21-A28 in the storage section 303. The display section 302 displays an input operation registration screen for registering an input operation. FIG. 5 is a schematic diagram exemplifying an input operation registration screen displayed on the display section 302. Character strings 'Please specify the operation method. You can print by the registered operation' is displayed on the input operation registration screen. An input operation input image B11 is displayed below the character strings displayed on the input operation registration screen.

An icon 'Undo' B12 is displayed below the input operation input image B11 displayed on the input operation registration screen. An icon 'Registration' B13 is displayed on the right of the icon 'Undo' B12 displayed on the input operation registration screen. If the user operates the input operation input image B11, then an input operation is stored in the storage section 303 as a registered input operation. 'Tap' is stored in the storage section 303 as an input operation registered by default before an input operation is registered using the input operation registration screen.

By inputting the input operation input image B11, the user can register a specified input operation as a registered input operation in the input terminal 300. The registered input operation stored in the storage section 303 is deleted when the icon 'Undo' 312 is operated. By operating the icon 'Undo' B12, the user can input a new input operation on the input operation input image B11 again. The input operation stored in the storage section 303 is stored as a registered input operation when the icon 'Registration' 313 is operated. If a registered input operation has stored in the storage section 303, the registered input operation is updated.

The control section 304 functions as the control center of the input terminal 300. The control section 304 controls each section of the input terminal 300. The control section 304 supplies the input operation information supplied from the input section 301 to the display section 302, the storage section 303 and the sending/receiving section 305.

The control section 304 updates the content displayed by the display section 302 according to the input operation information supplied from the input section 301. For example, it is assumed that input operation information on the icon 'Paper Size' A11 is supplied from the input section 301 to the control section 304. In this case, the control section 304 updates the content displayed on the icon 'Paper Size' A11 displayed on the display section 302. Specifically, it is assumed that 'Letter (8½×11")' is displayed on the icon 'Paper Size' A11. In this case, the control section 304 updates the content displayed on the icon 'Paper Size' A11 to 'Legal (8½×14")'. The sending/receiving section 305 sends the print start information sent from the control section 304 to the image forming apparatus 100.

The screen switching section 306 is a button for switching the screen displayed on the display section 302 through an operation of the user. If the user operates the screen switching section 306, then the screen switching section 306 supplies screen switching information to the control section 304. The control section 304 sends the supplied screen switching information to the display section 302. After receiving the screen switching information, the display section 302 switches the screen displayed. If the screen switching information is supplied when the print setting screen is displayed, the display section 302 switches the print setting screen to the input operation registration screen.

Figure 6:
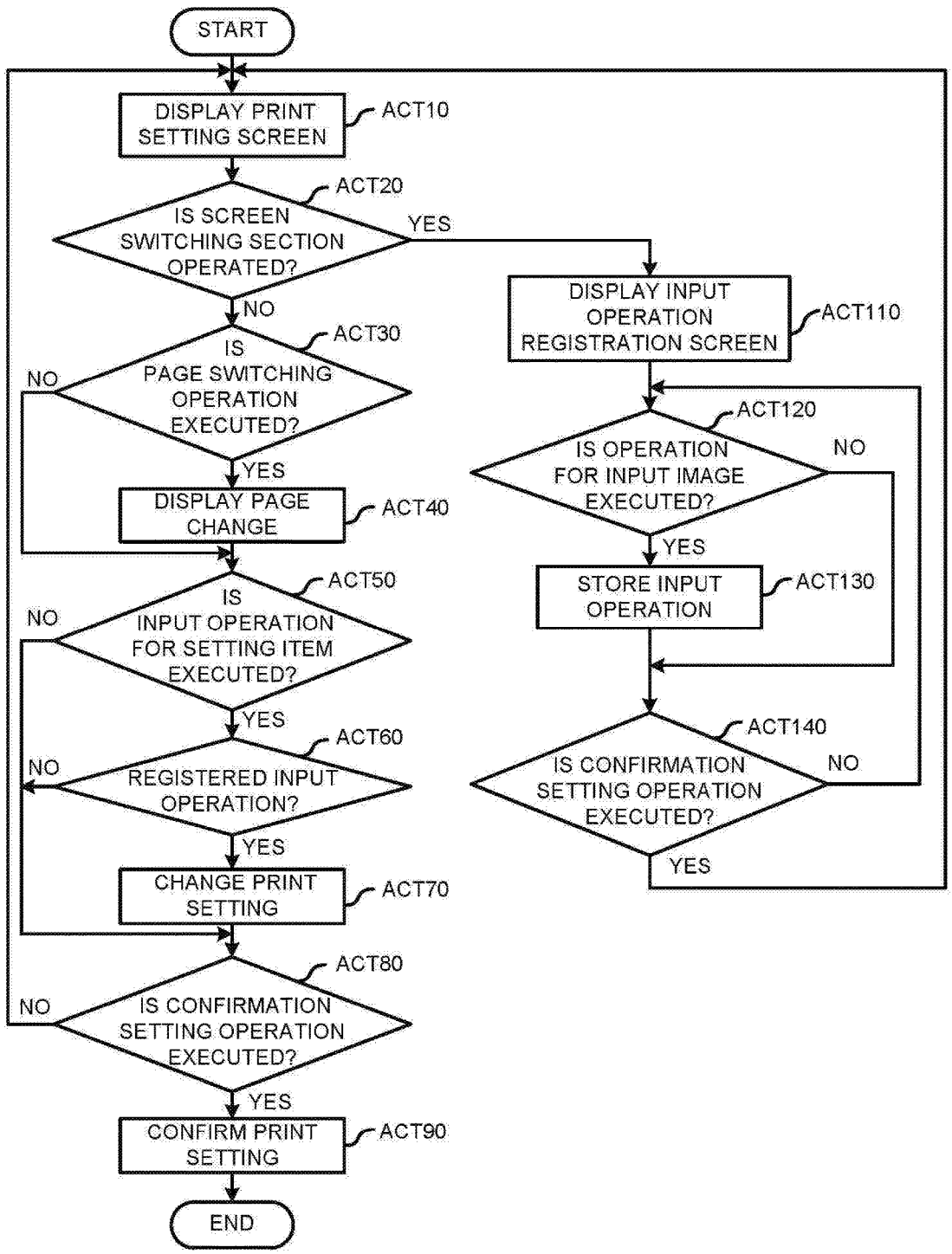
FIG. 6 is a flowchart illustrating procedures of a print setting operation according to the embodiment.

Next, a print setting processing executed by the image forming system 1 according to the embodiment to set a print setting is described with reference to FIG. 6. The print setting is executed by the input terminal 300.

To start a print setting, the control section 304 displays a print setting screen on the display section 302 (Act 10). Then, the control section 304 determines whether or not the screen switching section 306 is operated (Act 20). Specifically, whether or not the screen switching section 306 is operated is determined according to whether or not screen switching information is supplied from the screen switching section 306. The control section 304 determines that the screen switching section 306 is not operated (Act 20: No) as no screen switching information is supplied from the screen switching section 306. In this case, the control section 304 determines whether or not a page switching operation is executed to switch between the pages of the print setting screen (Act 30). Specifically, the control section 304 determines whether or not input operation information corresponding to an input operation for the icon 'Next' A17 is supplied from the input section 301. If input operation information corresponding to the input operation for the icon 'Next' A17 is supplied from the input section 301, the control section 304 determines that the page switching operation is executed.

After determining that the page switching operation is executed to switch between the pages of the print setting screen (Act 30: Yes), the control section 304 changes the page displayed on the display section 302 (Act 40). After determining that no page switching operation is executed to switch between the pages of the print setting screen (Act 30: No), the control section 304 executes the processing in Act 50 without carrying out the processing in Act 40.

Sequentially, the control section 304 determines whether or not an input operation is executed on one of the setting item icons A11-A16 displayed on the display section 302 (Act 50). Specifically, the control section 304 determines whether or not input operation information corresponding to an input operation of one of the setting item icons A11-A16 is supplied from the input section 301. If an input operation is executed (Act 50: Yes), the control section 304 determines whether or not the input operation is the same as the registered input operation (Act 60).

If the input operation is the same as the registered input operation (Act 60: Yes), the control section 304 changes a print setting (Act 70). Specifically, the control section 304 updates the print setting information which is stored in the storage section 303 as print setting items subjected to input operation. For example, if an input operation is executed on the icon 'Paper Size' A11, the control section 304 updates the print setting information 'Letter (8½×11")' of the icon 'Paper Size' to 'Legal (8½×14")' and stores the updated print setting information. Further, If none of the icons A11-A16 is operated (Act 50: No), the control section 304 proceeds to the processing in Act 80 without changing existing print setting. If the input operation is not the same as the registered input operation (Act 60: No), the control section 304 proceeds to the processing in Act 80 without changing existing print setting.

Sequentially, the control section 304 determines whether or not an input operation is executed on the icon 'OK' A18 for confirmation displayed on the display section 302 (Act 80). Specifically, the control section 304 determines whether or not input operation information corresponding to an input operation for the icon 'OK' A18 is supplied from the input section 301. If the input section 301 supplies input operation information corresponding to the input operation for the icon 'OK' A18 to the control section 304, the control section 304 determines that an input operation is executed on the icon 'OK' A18.

After determining that an input operation is executed on the icon 'OK' A18 (Act 80: Yes), the control section 304 confirms the print setting (Act 90). Then, the print setting processing is ended. On the other hand, after determining that no input operation is executed on the icon 'OK' A18 (Act 80: No), the control section 304 returns to carry out the processing in Act 10 to repeat the processing.

Further, if it is determined that the screen switching section 306 is operated in Act 20 (Act 20: Yes), the control section 304 causes the display section 302 to display the input operation registration screen (Act 110). Specifically, the control section 304 carries out a display control of causing the display section 302 to display the input operation registration screen.

Then, whether or not an input operation is executed on the input operation input image B11 on the input operation registration screen is determined (Act 120). Specifically, the control section 304 determines whether or not the input operation information corresponding to an input operation for the input operation input image B11 is supplied from the input section 301. If the input operation information corresponding to the input operation for the input operation input image B11 is supplied from the input section 301, the control section 304 determines that an input operation is executed on the input operation input image B11.

If it is determined that an input operation is executed on the input operation input image B11 (Act 120: Yes), the control section 304 stores the input operation executed on the input operation input image B11 in the storage section 303 as a registered input operation (Act 130). Moreover, if it is determined that no input operation is executed on the input operation input image B11 (Act 120: No), the control section 304 directly carries out the processing in Act 140 without carrying out the processing in Act 130.

Sequentially, the control section 304 determines whether or not an input operation is executed on the icon 'Registration' B13 for confirmation (Act 140). Specifically, the control section 304 determines whether or not input operation information corresponding to an input operation for the icon 'Registration' B13 is supplied from the input section 301. If the input operation information corresponding to the input operation for the icon 'Registration' B13 is supplied from the input section 301, the control section 304 determines that an input operation is executed on the icon 'Registration' 313.

If determining that no input operation is executed on the icon 'Registration' 313 (Act 140: No), the control section 304 returns to carry out the processing in Act 120. Moreover, if determining that an input operation is executed on the icon 'Registration' 313 (Act 140: Yes), the control section 304 returns to carry out the processing in Act 10.

Figure 7A:
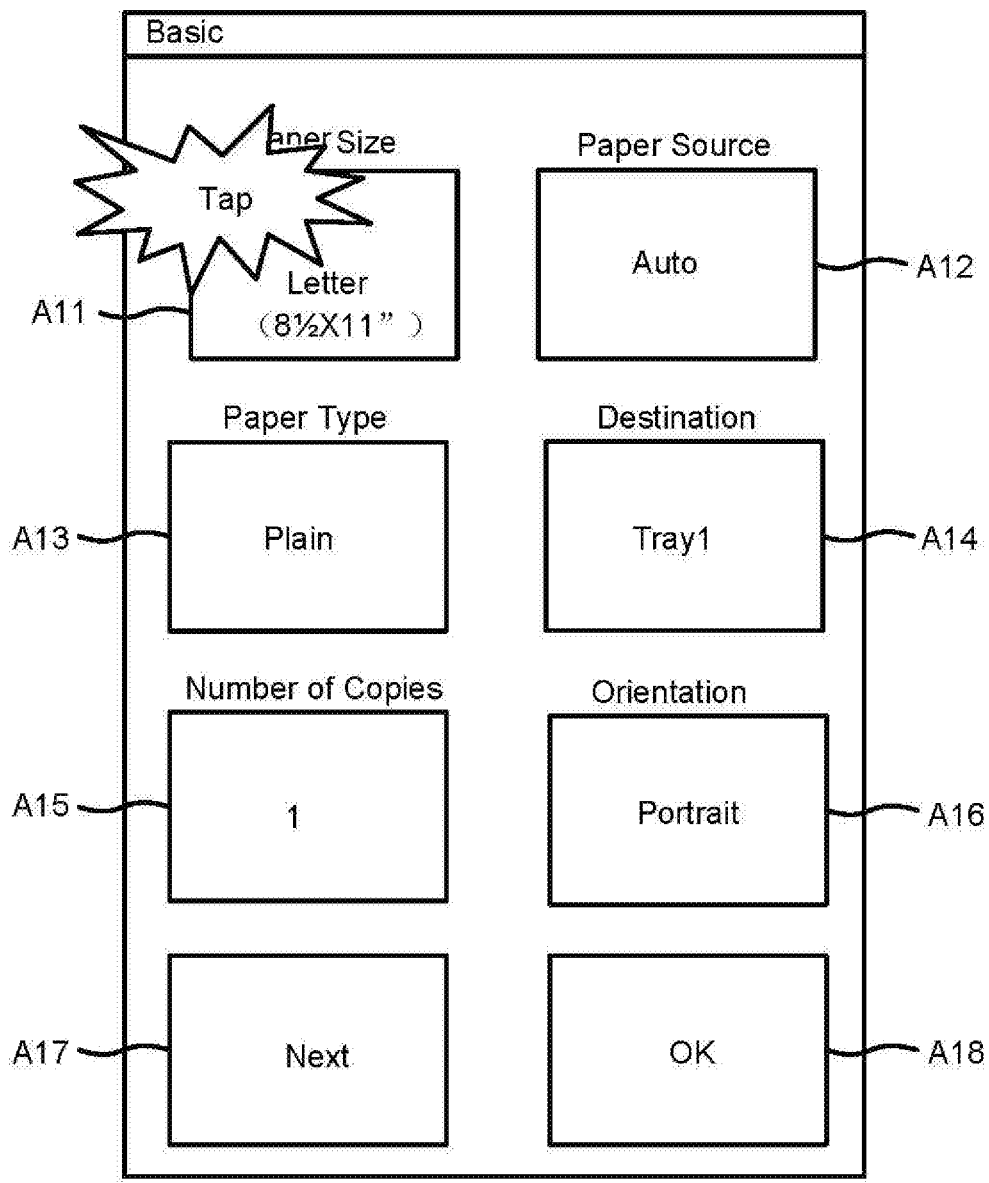
FIG. 7A is a schematic diagram exemplifying a change in a print setting screen according to the embodiment.
Figure 7B:
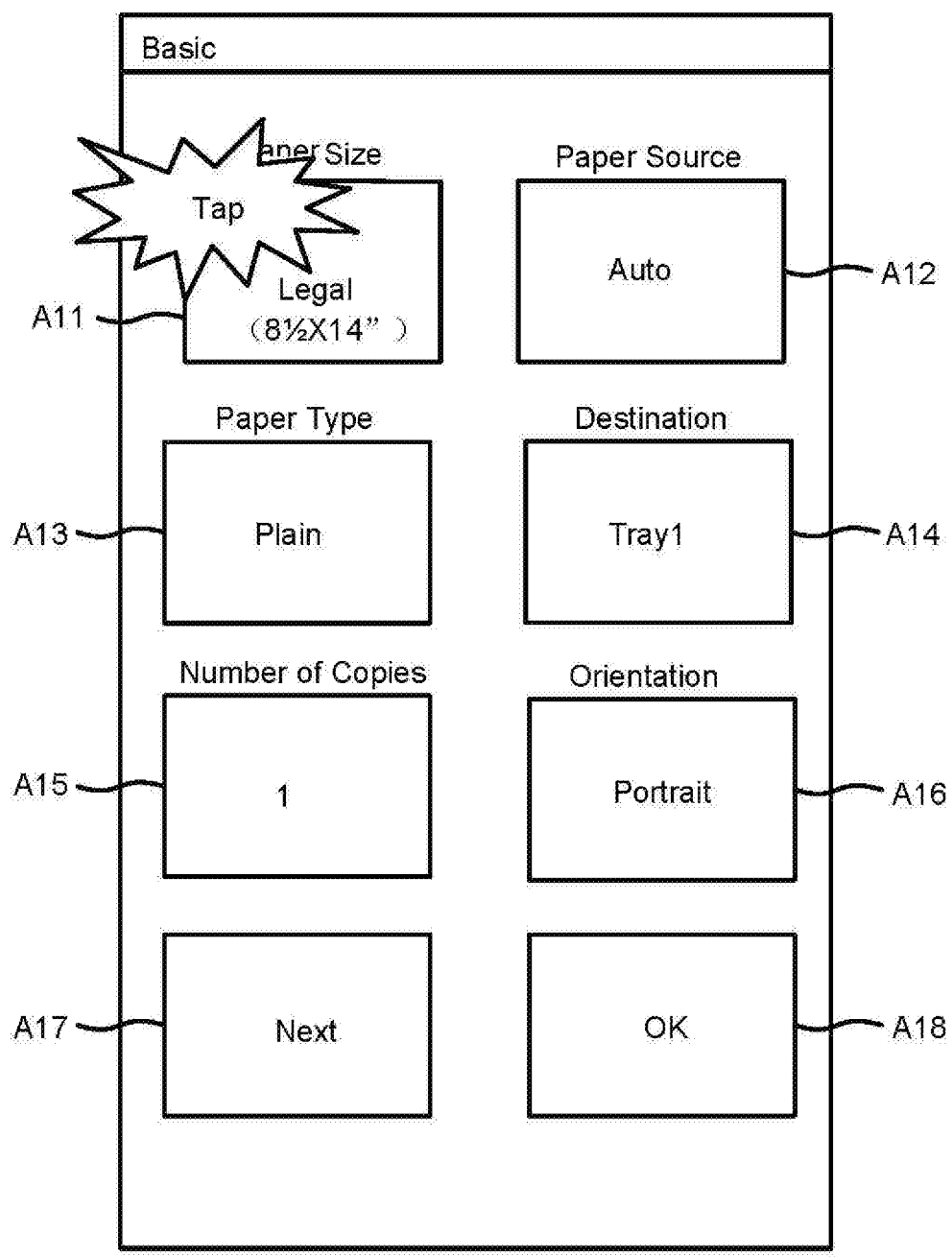
FIG. 7B is a schematic diagram exemplifying a change in a print setting screen according to the embodiment.

Next, a print setting set by operating the input section 301 is exemplified below. In the example, 'tap' is initially set as a registered input operation. A print setting screen is displayed on the display section 302 to carry out a print setting, as shown in FIG. 7A. The icon 'Paper Size' A11, the icon 'Paper Source' A12, the icon 'Paper Type' A13, the icon 'Destination' A14, the icon 'Number of Copies' A15 and the icon 'Orientation' A16 are displayed on the print setting screen. The user who wants to change the item 'Paper Size' taps the icon 'Paper Size' A11. The content displayed on the icon 'Paper Size' A11 is changed if the icon 'Paper Size' A11 is tapped. In this case, the content displayed on the icon 'Paper Size' A11 is changed from 'Letter (8½×11")' to 'Legal (8½×14")', as shown in FIG. 7B.

Figure 7C:
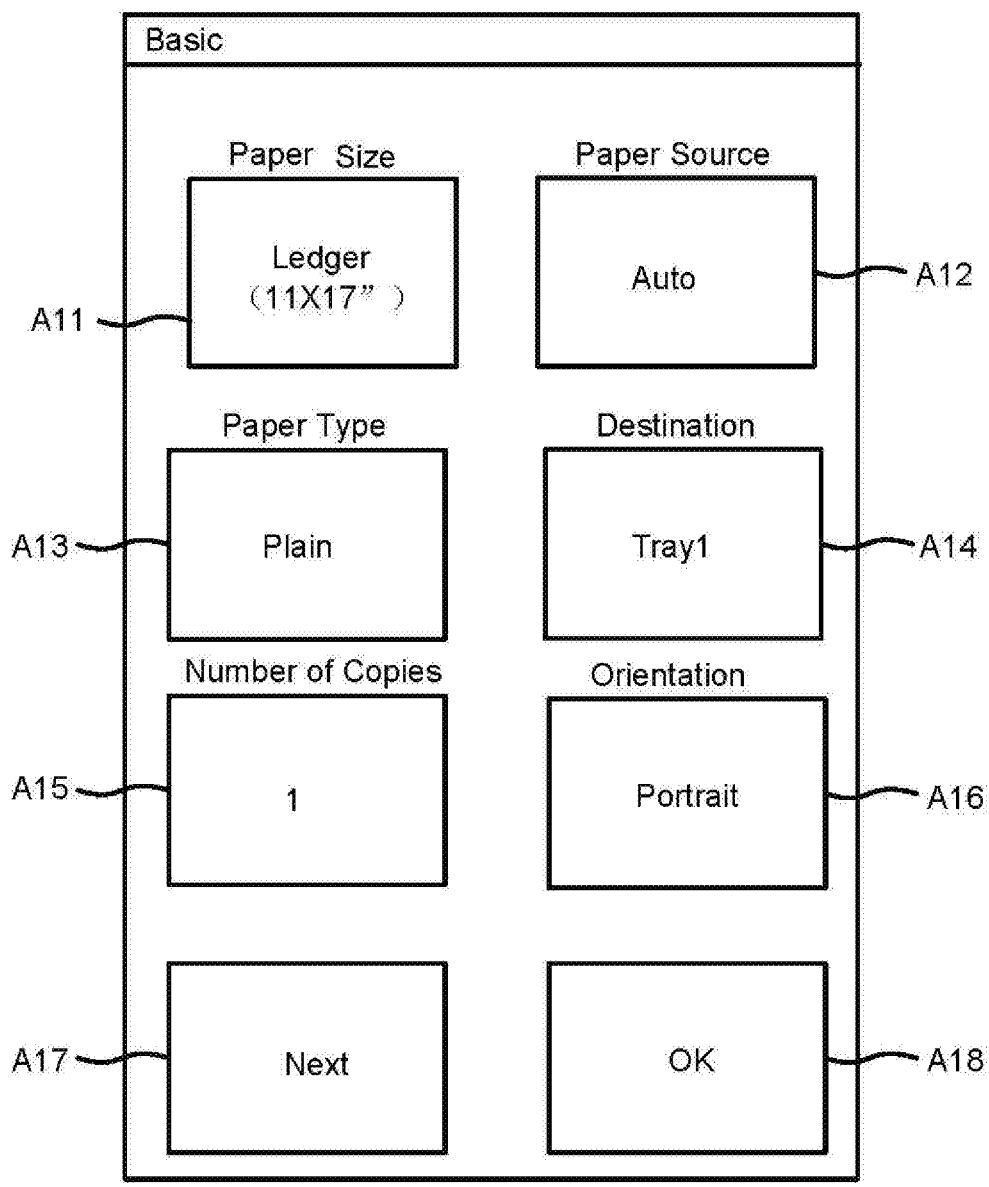
FIG. 7C is a schematic diagram exemplifying a change in a print setting screen according to the embodiment.

If the icon 'Paper Size' A11 is tapped again, then the content displayed on the icon 'Paper Size' A11 is changed again. In this case, the content displayed on the icon 'Paper Size' A11 is changed from 'Legal (8½×14")' to 'Ledger (11×17")', as shown in FIG. 7C. The content displayed on the icon 'Paper Size' A11 is changed every time the icon 'Paper Size' A11 is tapped. The content displayed on the icon 'Paper Size' A11 is changed back to the 'Letter (8½×11")' shown in FIG. 7A after the icon ' Paper Size' A11 is tapped a specific times.

The display of the other print setting items is changed in the same way. For example, the content displayed on the icon 'Paper Source' A12 is changed from 'Auto' to 'Manual' if the icon 'Paper Source' A12 is tapped. Further, the content displayed on the icon 'Paper Type' A13 is changed from 'Normal' to 'printing paper' after the icon 'Paper type' A13 is tapped. Moreover, the user taps the icon 'OK' A18 after a print setting is set as desired. The user confirms a print setting by tapping the icon 'OK' A18.

In the image forming system 1, all print items are set through a single input operation. For example, the single input operation is an operation such as 'tap icon'. Thus, the user is not required to operate each item in a different way to set a print setting. Even a person who is not used to operating the input terminal 300 can operate the image forming system 1 easily to carry out input operation for a print setting. Thus, the image forming system 1 is more convenient to use.

Further, in the image forming system 1, the print setting of a plurality of items are set through the same input operation. Thus, icons can be shared in the image forming system 1, thereby not needing a plurality of icons which correspond to the characteristics of items. Consequentially, icons can be displayed regularly in the image forming system 1. Specifically, if the input terminal 300 is a smart phone, then the screen of the input terminal 300 is generally small. In this case, icons displayed on the display section 302 are shared in the input terminal 300. In this manner, a plurality of icons can be displayed easily even on the smart phone having a small display screen.

Further, it is described in the foregoing example that the setting item icons A11-A16 receive the same input operation. The other icons such as the icon 'Next' A17 and the icon 'OK' may also be operated through the same input operation as the setting item icons A11-A16. The other icons such as the icon 'start printing' may also be operated through the same input operations as that described above. In this case, all the setting items from the start of a print job to the end of the print job can be executed through the same input operation in the image forming apparatus 100. Thus, the user can operate the image forming apparatus 100 more conveniently.

Figure 8B:
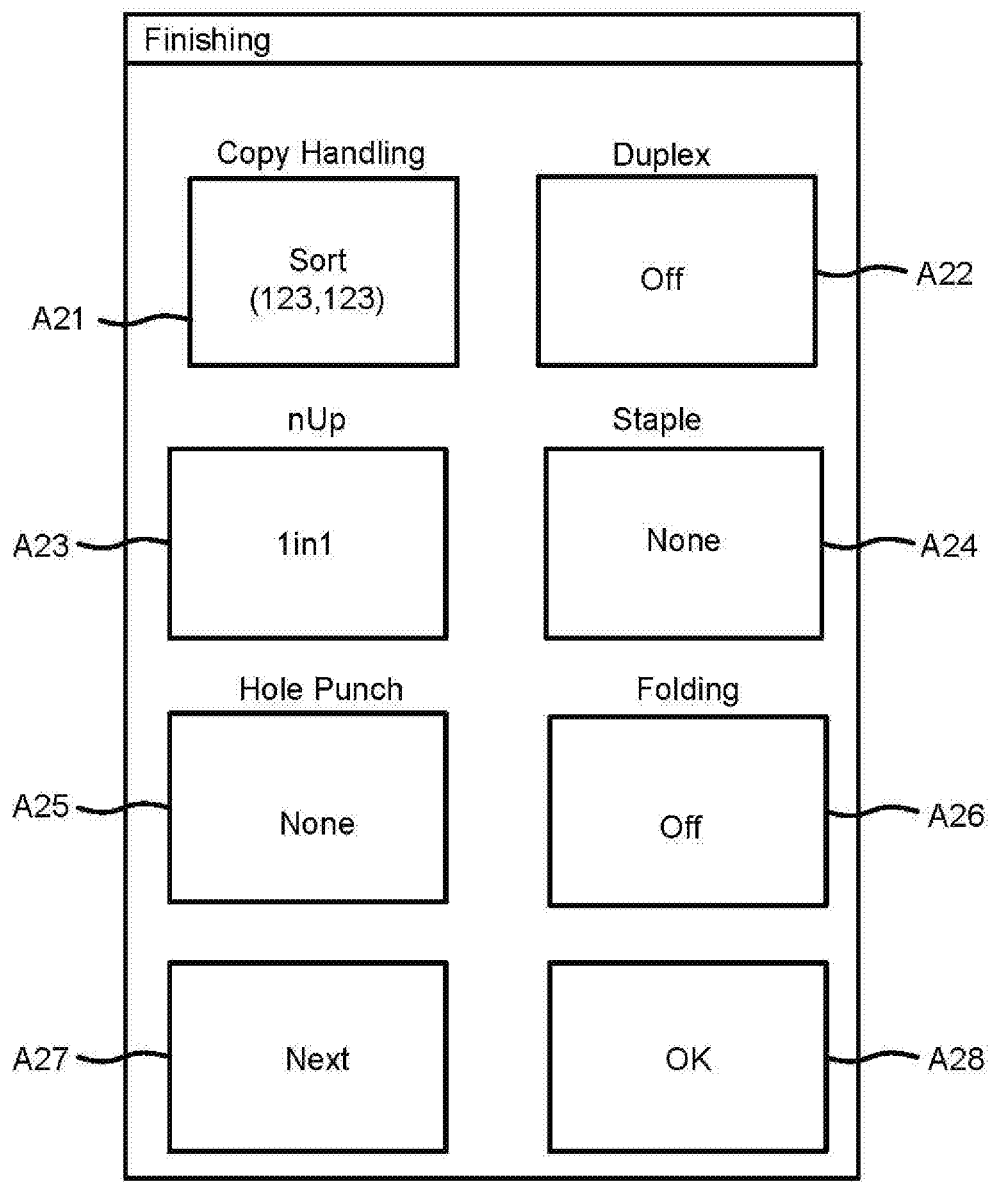
FIG. 8B is a schematic diagram exemplifying a change from a print setting screen to an input operation registration screen according to the embodiment.

Next, how to operate the input terminal 300 to change the current page of the print setting screen to the next page is described below. An icon 'Paper Size' A11, an icon 'Paper Source' A12, an icon 'Paper Type' A13, an icon 'Destination' A14, an icon 'Number of Copies' A15 and an icon 'Orientation' A16 are displayed on the print setting screen for a print setting, as shown in FIG. 8A. If the item the user desires to set is not included in the six items, the user taps the icon 'Next' A17. The next six icons shown in FIG. 8B are displayed on the print setting screen after the icon 'Next' A17 is tapped. The next six icons shown in FIG. 8B consist of an icon 'Copy Handling' A21, an icon 'Duplex' A22, an icon 'nUp' A23, an icon 'Staple' A24, an icon 'Hole Punch' A25 and an icon 'Folding' A26. The user taps the one of the icons A21-A26 which corresponds to the item the user desires to set. The item the user desires to set is set by tapping the icon corresponding to the item. Moreover, the user taps an icon 'OK' A28 after a print setting is set as desired. The user confirms the print setting by tapping the icon 'OK' A28.

In this way, in the image forming system 1, if a great number of items for a print setting are arranged, icons corresponding to the print setting items can be displayed in a plurality of different pages. In this case, by setting the icon 'Next' A17 for the display of a next page in advance, the next page can be displayed smoothly. Further, an input operation for the icon 'Next' A17 is the same as that for the icons A11-A16 corresponding to print setting items. Thus, the user can make the next page displayed easily.

In the foregoing embodiments, 'tap' and 'flick' are listed as a single input operation, however, the single input operation may be another input operation. Further, in input operations for determining the movement track of an input operation such as 'swipe', the operations having the same or similar movement track are the same input operation. Further, in addition to the registered input operation stored in the storage section 303 of the input terminal 300, the single input operation may also be the initially set registered input operation. One or more registered input operations may be initially set.

Further, the registered input operation is set through the actual input operation executed on the input operation input icon B11 displayed on the input operation registration screen. Thus, the user can practically try to set an input operation which is easy for the user to carry out. Moreover, in the image forming system 1, an input operation the user can carry out easily can be registered as a registered input operation. Thus, a user-preferred input operation can be set in the image forming system 1. The image forming system 1 is consequentially more convenient to use.

Further, a registered input operation can be set specifically for a user, thus avoiding a complicated input operation. A plurality of input operations may be registered as registered input operations for each user. Further, the device on which an input operation is carried out may be set to another device different from the input terminal 300. Further, the device on which an input operation is carried out may be the touch panel 110 of the image forming apparatus 100. Further, even if not being a touch panel consisting of integrated display section and input section, the device on which an input operation is carried out may be another device.

The foregoing another device may be a personal computer. The input operation may be a mouse operation in a case where the foregoing another device is a personal computer. In this case, the input operation may be 'double-click' or 'drag'.

Further, the registered input operation can be set to an input operation corresponding to a user. By making the input operation registered in the storage section 303 of the input terminal 300 corresponding to a user, a user-preferred input operation can be set. Thus, convenience for the user can be further improved. As a registered input operation can be registered for each user, even a user who is not familiar with a specific input operation can register a skilled input operation. Alternatively, even a user who is physically incapable of carrying out a specific input operation can carry out an input operation the user can carry out.

Further, a single input operation can be set according to different control method as the single input operation. In the foregoing embodiments, the control method refers to the advance of the display of the icon. Herein, the user taps each icon to forward the display of the icon. However, as a control method, the display of the icon is forwarded by tapping the icon and backed by swiping the icon. In this way, single input operation can be set corresponding to a control method.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An input apparatus, comprising:
a processor that executes instructions to perform operations, comprising:
displaying, on a display device, various reception images corresponding to various image formation settings on functions for image formation;
receiving an input operation carried out by a user on a reception image; and
generating image formation setting information for the input apparatus to set an image formation setting corresponding to the reception image subjected to the input operation after the input section receives the input operation carried out by the user on a reception image displayed on the display device, wherein
a single input operation is received as an input operation for the various image formation settings and an item for each of the various image formation settings is changed by the singe input operation.

2. The input apparatus according to claim 1, comprising:
a touch panel that facilitates the displaying and receiving, wherein the operations further comprise:
receiving an operation executed on a reception image corresponding to one of the various image formation settings displayed on the touch panel.

3. The input apparatus according to claim 2, the operations further comprising:
storing the input operation to a storage device; and
storing an input operation for the receiving to the storage device, wherein
the receiving receives the operations stored in the storage device for the reception images.

4. The input apparatus according to claim 3, wherein
the display device displays an input operation input image; and the operations further comprise:
receiving an input operation carries out on the displayed input operation input image; and
storing the input operation received to the storage device.

5. The input apparatus according to claim 2, wherein the operations further comprise:
receiving a tapping operation carried out by an organic or inorganic entity on the reception image or a swiping operation towards a given direction carried out by an organic or inorganic entity as the input operation.

6. The input apparatus according to claim 2, wherein reception images corresponding to the various image formation settings are displayed on a same screen.

7. The input apparatus according to claim 1, wherein
the display device displays a confirmation image for confirming the image formation setting; and the operations further comprise:
receiving an input operation carried out on the confirmation image through the single input operation; and confirming the image formation setting if the input operation carried out on the confirmation image is received.

8. The input apparatus according to claim 1, wherein an input operation corresponding to the operation of the user who carries out the image formation setting is determined as the single input operation.

9. An image forming system comprising an input apparatus, an image forming apparatus, and a processor, wherein
the input apparatus comprises facilitating the processor to execute operations to perform operations, comprising:
displaying, on a display device, various reception images corresponding to various image formation settings on functions for image formation;
receiving an input operation carried out by a user on a reception image; and
generating image formation setting information for the image forming apparatus to set an image formation setting corresponding to the reception image subjected to the input operation after receiving the input operation carried out by the user on a reception image displayed on the display device, wherein
a single input operation is received as an input operation of the user to carry out the various image formation settings and an item for each of the various image formation settings is changed by the single input operation, and
the image forming apparatus comprises facilitating the processor to execute operations to perform operations, comprising:
setting an image formation setting corresponding to the image formation setting information; and
forming an image based on the image formation setting.

10. A non-transitory computer readable medium, comprising executable instructions that, when executed by a processor, facilitate performance of operations, comprising:
displaying various reception images corresponding to various image formation settings on functions for image formation;
receiving an input operation carried out by a user on an reception image; and
generating image formation setting information for an image forming apparatus to set an image formation setting corresponding to the reception image subjected to the input operation after an input section receives the input operation carried out by a user on a reception image displayed on a display device, wherein
the input section receives a single input operation as an input operation carried out by the user to set the various image formation settings and an item for each of the various image formation settings is changed by the single input operation.

* * * * *